United States Patent [19]

Kuriki

[11] Patent Number: 5,250,928
[45] Date of Patent: Oct. 5, 1993

[54] GRAPHICS DECODER

[75] Inventor: Shinji Kuriki, Koufu, Japan

[73] Assignees: Pioneer Video Corporation, Yamanashi; Pioneer Electronic Corporation, Tokyo, both of Japan

[21] Appl. No.: 903,165

[22] Filed: Jun. 24, 1992

[30] Foreign Application Priority Data

Oct. 16, 1991 [JP] Japan .................................. 3-267797

[51] Int. Cl.$^5$ .............................................. G09G 1/28
[52] U.S. Cl. .................................... 345/153; 345/125; 345/143
[58] Field of Search ............... 340/703, 724, 726, 799, 340/735; 358/21 R

[56] References Cited

U.S. PATENT DOCUMENTS

| | | | |
|---|---|---|---|
| 4,673,929 | 6/1987 | Nelson et al. | 340/703 |
| 4,684,942 | 8/1987 | Nishi et al. | 340/703 |
| 4,697,176 | 9/1987 | Kawakami | 340/703 |

Primary Examiner—Ulysses Weldon
Assistant Examiner—Matthew Luu
Attorney, Agent, or Firm—Fish & Richardson

[57] ABSTRACT

A graphics decoder which stores color number data of each pixel of the display screen, which is acquired from a subcode signal, sequentially reads out the color number data to produce a graphics RGB signal referring to a color look-up table, and supplies the graphics RGB signal to a CRT display. When a graphics command acquired from the subcode signal is a screen-scroll command, scroll data is obtained from pointer data included in that scroll command, and that scroll data is output at a timing synchronous with a horizontal sync signal or vertical sync signal to set the read address of the display memory. When the graphics command is a color look-up table write command, the color look-up table is updated at a timing synchronous with the first horizontal sync signal or vertical sync signal after the generation of that write command.

6 Claims, 9 Drawing Sheets

Fig. 1
PRIOR ART

| SYMBOL | R | S | T | U | V | W |
|---|---|---|---|---|---|---|
| 0 | MODE | | | ITEM | | |
| 1 | INSTRUCTION | | | | | |
| 2 | PARITY | | | Q0 | | |
| 3 | PARITY | | | Q1 | | |
| 4 | | | | | | |
| 5 | | | | | | |
| . | DATA | | | | | |
| . | | | | | | |
| . | FIELD | | | | | |
| 19 | | | | | | |
| 20 | PARITY | | | P0 | | |
| 21 | PARITY | | | P1 | | |
| 22 | PARITY | | | P2 | | |
| 23 | PARITY | | | P3 | | |

Fig. 2
PRIOR ART

PIXEL COLUMN : 0 1 2 3 4 5

PIXEL ROW : 0 1 2 . . . 10 11

| | R | S | T | U | V | W | | |
|---|---|---|---|---|---|---|---|---|
| 1 = | 0 | 0 | 0 | 0 | 0 | 1 | : | PRESET MEMORY |
| 2 = | 0 | 0 | 0 | 0 | 1 | 0 | : | PRESET BORDER |
| 6 = | 0 | 0 | 0 | 1 | 1 | 0 | : | WRITE FOREGROUND/BACKGROUND FONT |
| 20 = | 0 | 1 | 0 | 1 | 0 | 0 | : | PRESET-FURNISHED SOFT SCROLL SCREEN |
| 24 = | 0 | 1 | 1 | 0 | 0 | 0 | : | COPY-FURNISHED SOFT SCROLL SCREEN |
| 30 = | 0 | 1 | 1 | 1 | 1 | 0 | : | LOAD CLUT COLOR 0 - 7 |
| 31 = | 0 | 1 | 1 | 1 | 1 | 1 | : | LOAD CLUT COLOR 8 - 15 |
| 38 = | 1 | 0 | 0 | 1 | 1 | 0 | : | TAKE EXCLUSIVE-OR OF TWO COLORS TO A FONT |
| 28 = | 0 | 1 | 1 | 1 | 0 | 0 | : | SET TRANSPARENCY |

Fig. 5
PRIOR ART

| SYMBOL | R | S | T | U | V | W |
|---|---|---|---|---|---|---|
| 4 | O | O | \multicolumn{4}{c|}{COLOR} | | | |
| 5 | O | O | \multicolumn{4}{c|}{REPEAT} | | | |
| 6 | O | O | O | O | O | O |
| 7 | . | | | | | . |
| . | . | | | | | . |
| . | . | | | | | . |
| . | . | | | | | . |
| 18 | . | | | | | . |
| 19 | O | O | O | O | O | O |

Fig. 6
PRIOR ART

| SYMBOL | R | S | T | U | V | W |
|---|---|---|---|---|---|---|
| 4 | O | O | \multicolumn{4}{c|}{COLOR} | | | |
| 5 | O | O | O | O | O | O |
| 6 | . | | | | | . |
| . | . | | | | | . |
| . | . | | | | | . |
| . | . | | | | | . |
| 18 | . | | | | | . |
| 19 | O | O | O | O | O | O |

Fig. 7
PRIOR ART

| SYMBOL | R | S | T | U | V | W |
|---|---|---|---|---|---|---|
| 4 | CH0 | | COLOR0 | | | |
| 5 | CH1 | | COLOR1 | | | |
| 6 | 0 | | ROW | | | |
| 7 | COLUMN | | | | | |
| 8 | Y | | | | | |
| . | | | | | | |
| . | | FONT | | | | |
| . | | | | | | |
| 18 | | | | | | |
| 19 | | | | | | Z |

Fig. 8
PRIOR ART

| SYMBOL | R | S | T | U | V | W |
|---|---|---|---|---|---|---|
| 4 | 0 | 0 | COLOR | | | |
| 5 | COPH | | 0 | | P H | |
| 6 | COPV | | | P V | | |
| 7 | 0 | 0 | 0 | 0 | 0 | 0 |
| . | . | . | . | . | . | . |
| . | . | . | . | . | . | . |
| . | . | . | . | . | . | . |
| . | . | . | . | . | . | . |
| . | . | . | . | . | . | . |
| 19 | 0 | 0 | 0 | 0 | 0 | 0 |

Fig. 9 PRIOR ART

| SYMBOL | R | S | T | U | V | W |
|---|---|---|---|---|---|---|
| 4 | O | O | O | O | O | O |
| 5 | COPH | | O | P | | H |
| 6 | COPV | | | P | | V |
| 7 | O | O | O | O | O | O |
| . | | | | | | |
| . | | | | | | |
| . | | | | | | |
| . | | | | | | |
| . | | | | | | |
| . | | | | | | |
| 19 | O | O | O | O | O | O |

Fig. 10 PRIOR ART

| SYMBOL | R | S | T | U | V | W | |
|---|---|---|---|---|---|---|---|
| 4 | | | COLOR-0 | | | | |
| 5 | | | | | | | |
| 6 | | | COLOR-1 | | | | |
| 7 | | | | | | | |
| 8 | | | | | | | |
| . | | | RED | | GR0 | | ⎫ |
| . | GR1 | | | | BLUE | | ⎬ COLOR-n |
| . | | | | | | | ⎭ |
| 17 | | | | | | | |
| 18 | | | COLOR-7 | | | | |
| 19 | | | | | | | |

Fig. 11
PRIOR ART

| SYMBOL | R S T U V W |
|---|---|
| 4 | TRANS - 0 |
| 5 | TRANS - 1 |
| 6 | TRANS - 2 |
| 7 | TRANS - 3 |
| 8 | ⋮ |
| ⋮ | |
| 17 | |
| 18 | TRANS - 14 |
| 19 | TRANS - 15 |

GRAPHICS DECODER

BACKGROUND OF THE INVENTION

1. Field of the Invention

The present invention relates to a graphics decoder that produces a graphics RGB signal, which is to be supplied to an image display apparatus such as a CRT display, from a command signal including various types of graphics data, such as a subcode signal acquired by playing a recording medium.

2. Description of the Related Art

In addition to a digital audio signal which is a main code signal, a subcode signal is recorded on a disc, such as a compact disc. The subcode is standardized as described in detail in, for example, *JAS Journal*, October 1986, issued by Japan Audio Society. Before going into the description of prior art, the standards of the subcode will briefly be discussed.

A subcode includes channels R to W in addition to channels P and Q which are used for playback control on a main code signal; the former channels R to W are used for graphics or the like as described later. As a subcode consists of only one bit per channel in a single main frame, all subcodes for 98 main frames (two frames of which are sync signal patterns) are grouped into a single subcode frame. As 6-bit data consisting of the channels R to W is handled, those six bits are defined as one symbol, and 24 symbols are defined as one pack. One subcode frame therefore consists of 96 symbols.

In each pack, as shown in FIG. 1, symbol 0 includes a 3-bit mode and a 3-bit item, both specifying the mode of that pack; for example, mode=000 and item=000 specifies the ZERO mode, while mode=001 and item=001 specify the TV graphics mode. Symbol 1 is set as an instruction, and symbols 4 to 19 are designated as a data field. The "instruction" is a command to determine the attribute of a data field. Symbols 2 and 3 are Q parities (Q0 and Q1) for error correction for symbols 0 and 1. Symbols 20 to 23 are P parities (P0 to P3) for error correction for symbols 0 to 19.

In TV graphics mode, the structure of a TV screen is set on the basis of a unit called "font". One font consists of six pixels in the horizontal (column) direction and twelve pixels in the vertical (row) direction, as shown in FIG. 2, each pixel being the smallest displayable picture element. 48 (horizontal) by 16 (vertical) fonts form a screen region that is actually displayable on a TV screen, and the outer region is called a border region. A display memory for the TV screen contains 50 by 18 fonts yielded by adding one font to the top and bottom as well as the right and left of the screen region as shown in FIG. 3. Pointers are defined to accomplish a soft scroll. The horizontal screen pointer PH represents the amount of horizontal shift to move all the pixel data in the display memory in the horizontal direction, and the vertical screen pointer PV the amount of vertical shift to move all the pixel data in the display memory in the vertical direction.

For the TV graphics mode, instructions are defined as shown in FIG. 4. In the instruction 1, which is a command to preset the display memory, the data region in a pack is constituted as shown in FIG. 5. All the fonts in the display memory are preset to color numbers set by COLOR in symbol 4, and the pointers PH and PV are reset to "0". In the instruction 2, which is a command to preset the border, the data region in a pack is constituted as shown in FIG. 6. The border region is preset to a color number set by COLOR in symbol 4. In the instruction 6, which is a command to write foreground/background fonts, the data region in a pack is constituted as shown in FIG. 7. This command is to write font data (color number data) of symbols 8 to 19 at the address designated by the row specified by symbol 6 and the column specified by symbol 7. In FIG. 7, "Y" indicates the upper leftmost pixel in the font, and "Z" the lower rightmost pixel in the font. For a pixel with font data of "0", the font with the color number specified by COLOR 0 in symbol 4 is written as the background color in bit planes 0 to 3, while for a pixel with font data of "1", the font with the color number specified by COLOR 1 in symbol 5 is written as the foreground color in those bit planes.

In the instruction 20, which is a preset-furnished command to scroll the screen, the data region in a pack is constituted as shown in FIG. 8. COPH in symbol 5 represents the horizontal movement of font data in the display memory. COPH=0 indicates no horizontal movement, and COPH=1 indicates the rightward movement of all the font data, so that the old font data of the 49-th column is scrolled out of the screen to the right and the font data of the 0-th column becomes the color number set by COLOR of symbol 4. COPH=2 indicates the leftward movement of all the font data, so that the old font data of the 0-th column is scrolled out of the screen to the left and the font data of the 49-th column becomes the color number set by COLOR of symbol 4. COPV in symbol 6 represents the vertical movement of font data in the display memory. COPV=0 indicates no vertical movement, and COPV=1 indicates the downward movement of all the font data, so that the old font data of the 17-th row is scrolled down out of the screen and the font data of the 0-th row becomes the color number set by COLOR of symbol 4. COPV=2 indicates the upward movement of all the font data, so that the old font data of the 0-th row is scrolled up out of the screen and the font data of the 17-th row becomes the color number set by COLOR of symbol 4. The horizontal screen pointer PH is set within the range of 0 to 5 pixels, and the vertical screen pointer PV within the range of 0 to 11 pixels.

In the instruction 24, which is a copy-furnished command to scroll the screen, the data region in a pack is constituted as shown in FIG. 9. COPH in symbol 5 represents the horizontal movement of font data in the display memory. COPH=0 indicates no horizontal movement, and COPH=1 indicates the rightward movement of all the font data, so that the old font data of the 49-th column becomes the font data of the 0-th column. COPH=2 indicates the leftward movement of all the font data, so that the old font data of the 0-th column becomes the font data of the 49-th column. COPV in symbol 6 represents the vertical movement of font data in the display memory. COPV=0 indicates no vertical movement, and COPV=1 indicates the downward movement of all the font data, so that the old font data of the 17-th row becomes the font data of the 0-th row. COPV=2 indicates the upward movement of all the font data, so that the old font data of the 0-th row becomes the font data of the 17-th row.

In the instruction 30, which is a command to load CLUT colors 0 to 7, the data region in a pack is constituted as shown in FIG. 10. This command designates the first eight colors in a color look-up table (hereinafter referred to as "CLUT") that specifies which color among sixteen colors the above color number is. In symbols 4 to 19, graphics RGB data indicated by COLOR-0 to COLOR-7 is set using two symbols per color. The instruction 31, which is a command to load CLUT colors 8 to 15, designates the second eight colors in the CLUT, so that COLOR-8 to COLOR-15 are set in symbols 4 to 19 using two symbols per color. With regard to the color tones of individual color numbers, red consists of channels R to U, four bits, of an even-numbered symbol assigned to a single color number, green consists of the subsequent channels V and W (two bits) and channels R and S (two bits) of the next odd-numbered symbol, and blue consists of the subsequent channels T to W (four bits). As there are $2^4=16$ gray scales of each color, $16^3=4096$ color tones are possible for the three primary colors (RGB). The gray scale of "0000" designates the darkest state, and "1111" the highest luminance.

The instruction 38, an EXCLUSIVE-OR FONT command, expands the color of a font written in two colors or one color by the PRESET command or the WRITE FOREGROUND/BACKGROUND FONT command to 16 colors. Since this command is not so pertinent to the present invention to be described later, no further details will be given.

In the instruction 28, a SET TRANSPARENCY command, the region in a pack is constituted as shown in FIG. 11. This command is to set the ratio of combination of graphics to a dynamic image when both are combined, and designates it by TRANS-0 to TRANS-15 of symbols 4 to 19 with to a transparency look-up table (hereinafter referred to as "TLUT") indicating the transparency of each of 16 colors specified by the CLUT. With this design, 64 scales of transparency are settable by six bits for the color of every pixel, "000000" indicating the opaque state and "111111" indicating the highest transparency.

Based on subcodes defined as above, the graphics decoder produces RGB signals for TV graphics from the subcode signal supplied from a disc player. The conventional subcode graphics decoder whose structure is schematically shown in FIG. 12 receives the subcode signal acquired by the disc player processing a read signal, and interprets the graphics command of the subcode signal in a command interpreter 1. The result of the interpretation in the interpreter 1, a command such as the WRITE FONT command, or data such as font data is supplied to one of an address controller 2, a V-RAM 3 and a CLUT RAM 4, in accordance with the type of the data. The address controller 2 sets the write address according to the write command and sets the read address according to various kinds of data, such as COPH at the time of scrolling. The V-RAM 3 is a display memory having a memory area corresponding to at least the screen region. The RAM 4 has an area to store RGB data corresponding to color numbers for 16 colors. For instance, when the interpreter 1 interprets the WRITE FONT command of the instruction 6, the address of the V-RAM 3 specified by the row and column that are included as data in that command is designated by the address controller 2, and color number data, i.e. font data is written in the memory location at that address. Reading of font data from the V-RAM 3 is executed in accordance with the vertical sync signal and horizontal sync signal, and based on the read font data, the RGB data with the associated color number is read out from the RAM 4. The RGB data is converted into an RGB signal by a D/A converter 5 before being supplied to a CRT display 6.

In the conventional graphics decoder, when the interpreter 1 interprets the LOAD CLUT COLOR 0-7 command of the instruction 30 or the LOAD CLUT COLOR 8-15 command of the instruction 31 from the received subcode signal, the stored data in the CLUT RAM 4 is rewritten, and the designated color for the color number is changed. Because this rewriting is executed immediately upon command interpretation, irrespective of the vertical and horizontal sync signals, however, the designated color for the foreground color or background color for the same font varies or flickering occurs on the screen while a video image of one field is being displayed on the CRT display 6.

Further, the graphics command occurs once in 1/300 sec in the supplied subcode signal, so that flickering or unnatural image distortion would occur on the screen even when the read address is relatively changed by the SCROLL SCREEN command.

SUMMARY OF THE INVENTION

It is therefore an object of the present invention to provide a graphics decoder which can prevent flickering or unnatural image distortion from occurring on the screen even when data such as a color number or designated color for the color number or a read address of a V-RAM is changed in accordance with a graphics command.

To achieve this object, according to the present invention, there is provided a graphics decoder for producing a graphics RGB signal to be supplied to an image display apparatus from a command code signal including various kinds of graphics data, comprising interpreting means for interpreting a graphics command in the command code signal; a display memory having a plurality of memory locations corresponding to pixels of the display image apparatus; writing means for, when a result of interpretation in the interpreting means is a write command, writing font-indicative color number data included in the write command at a designated memory location in the display memory; data generating means for, when the result of interpretation in the interpreting means is a screen-scroll command, generating scroll data in accordance with pointer data included in the screen-scroll command; read address setting means for sequentially setting a read address of the display memory in accordance with the scroll data; reading means for reading out color number data from that memory location in the display memory which corresponds to the read address; and first storage means having a color look-up table to be updated by graphics RGB data for each color number included in a color look-up table write command, for, when the result of interpretation in the interpreting means is the color look-up table write command, reading out graphics RGB data associated with the read-out color number data from the color look-up table and outputting the graphics RGB data as the graphics RGB signal, whereby outputting of new scroll data from the data generating means and updating of the color look-up table in the first storage means are performed at timings synchronous with a horizontal sync signal or a vertical sync signal of the image display apparatus.

In the graphics decoder embodying the present invention, when the graphics command is the screen-scroll command, scroll data HSP, VSP, PH and PV are acquired from pointer data COPH, COPV, PH and PV included in that scroll command, and that scroll data is output to the read address setting means at a timing synchronous with the horizontal sync signal or vertical sync signal to set the read address of the display memory, or when the graphics command is the color look-up table write command, the color look-up table is updated at a timing synchronous with the first horizontal sync signal or vertical sync signal after the generation of that write command.

BRIEF DESCRIPTION OF THE DRAWINGS

FIG. 1 is a diagram illustrating the structure of a pack;

FIG. 2 is a diagram illustrating the structure of a font;

Figure 3:
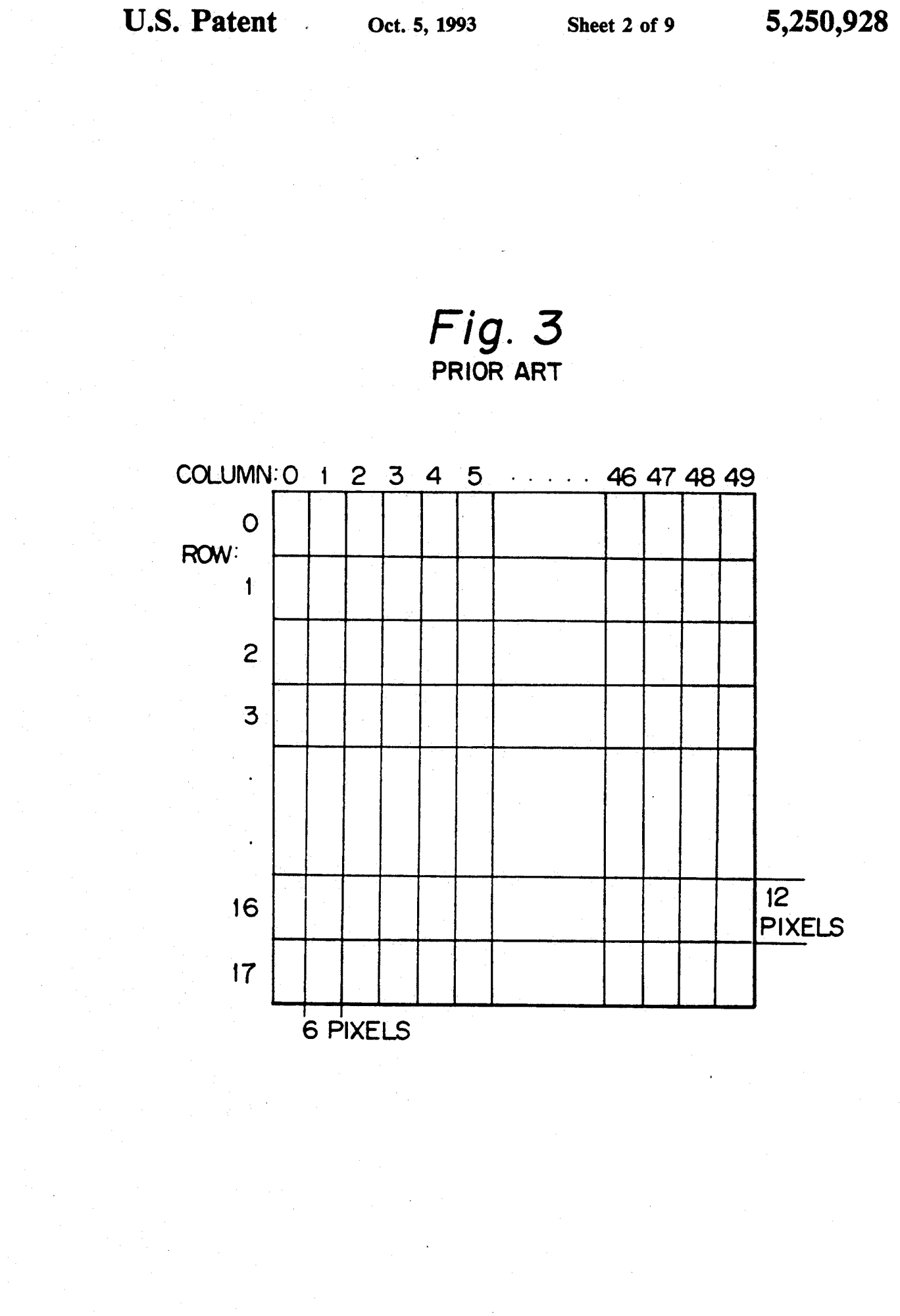

FIG. 3 is a diagram showing the structure of a display memory;

FIG. 4 shows the types of instructions of a TV graphics mode;

FIG. 5 is a diagram illustrating the structure of a data region in a pack in a PRESET DISPLAY MEMORY command;

FIG. 6 is a diagram illustrating the structure of a data region in a pack in a PRESET BORDER command;

FIG. 7 is a diagram illustrating the structure of a data region in a pack in a WRITE FOREGROUND-/BACKGROUND FONT command;

FIG. 8 is a diagram illustrating the structure of a data region in a pack in a preset-furnished SCROLL SCREEN command;

FIG. 9 is a diagram illustrating the structure of a data region in a pack in a copy-furnished SCROLL SCREEN command;

FIG. 10 is a diagram illustrating the structure of a data region in a pack in a LOAD CLUT COLOR 0-7 command;

FIG. 11 is a diagram illustrating the structure of a data region in a pack in a SET TRANSPARENT command;

DETAILED DESCRIPTION OF THE PREFERRED EMBODIMENT

A preferred embodiment of the present invention will now be described referring to the accompanying drawings.

Figure 12:
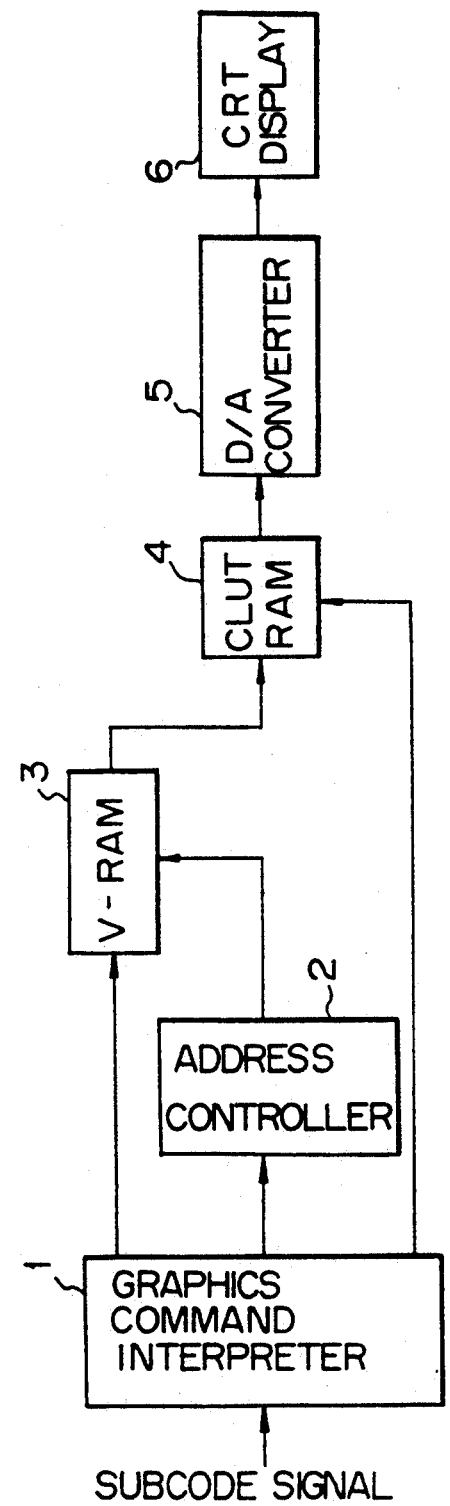
FIG. 12 is a block diagram showing the schematic structure of a conventional subcode graphics decoder.
Figure 13:
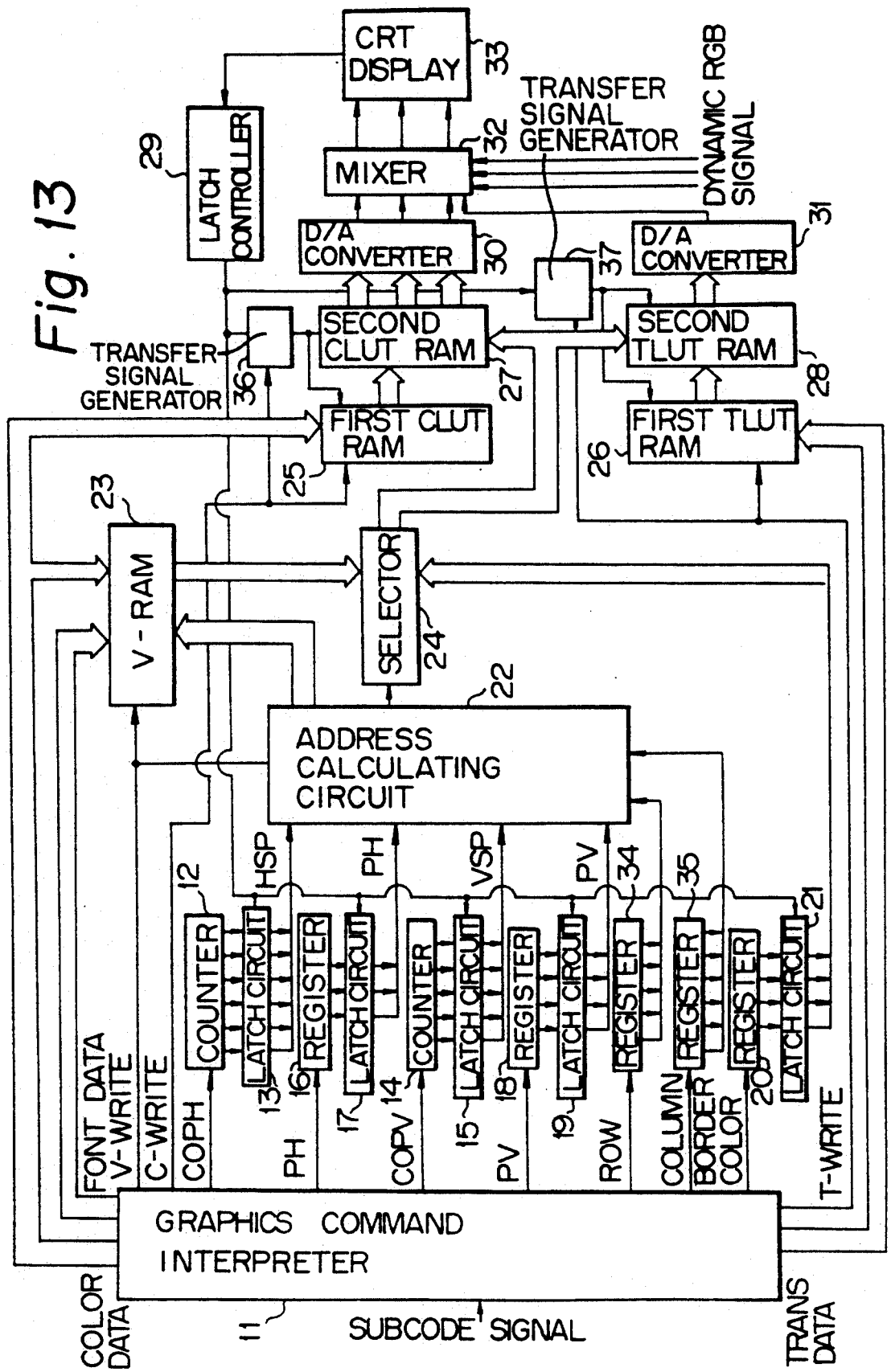
FIG. 13 is a block diagram showing an embodiment of the present invention.

FIG. 13 illustrates a subcode graphics decoder as one embodiment of the present invention. In this subcode graphics decoder, a subcode signal is supplied to a graphics command interpreter 11 from a disc player (not shown). The disc player, which is capable of playing a disc, such as a video disc (LDD) or CDV, processes a read signal from the disc to extract the subcode signal. The graphics command interpreter 11, which may be constituted of a hardware logic circuit, has output terminals, V-WRITE, C-WRITE, T-WRITE, COPH, COPV, PH, PV, ROW, COLUMN, BORDER COLOR, FONT DATA, COLOR DATA and TRANS DATA. Connected to the output terminal COPH is a modulo-50 up-down counter 12 which has a 6-bit output connected to a latch circuit 13. Connected to the output terminal COPV is a modulo-18 up-down counter 14 which has a 5-bit output connected to a latch circuit 15. Connected to the output terminal PH is a 3-bit register 16 which has its output connected to a latch circuit 17. Connected to the output terminal PV is a 4-bit register 18 which has its output connected to a latch circuit 19. Connected to the output terminal BORDER COLOR is a 4-bit register 20 whose output is connected to a latch circuit 21. The output signals of the latch circuits 13, 15, 17 and 19 are supplied to an address calculating circuit 22. The address calculating circuit 22 also receives signals from the output terminals ROW and COLUMN of the graphics command interpreter 11 via registers 34 and 35. The output of the address calculating circuit 22 is connected to the address terminal of a V-RAM 23. The output terminal V-WRITE of the graphics command interpreter 11 is connected to the address calculating circuit 22 and the W/R control terminal of the V-RAM 23, and the output terminal FONT DATA is connected to the data input terminal of the V-RAM 23.

A first color look-up table (CLUT) RAM 25 is connected to the output terminals C-WRITE and COLOR DATA. The RAM 25 has a memory capacity of 4 bits×16 for each RGB and is capable of storing RGB data indicating tones for 16 colors designated by the respective color number data. A second CLUT RAM 27 is connected to the output terminal of the RAM 25. Like the RAM 25, the RAM 27 has a memory capacity of 4 bits×16 for each RGB and is capable of storing RGB data indicating tones for 16 colors designated by the respective color number data. In accordance with a first transfer signal which is generated from a transfer signal generator 36 to be described later, all the data stored in the RAM 25 is read out in the order of addresses and is transferred to the RAM 27.

A first transparency look-up table (TLUT) RAM 26 is connected to the output terminals T-WRITE and TRANS DATA. The RAM 26 has a memory capacity of 6 bits×16 and is capable of storing transparency data designated in 64 scales for every 16 colors. A second TLUT RAM 28 is connected to the output terminal of the RAM 26. Like the RAM 26, the RAM 28 has a memory capacity of 6 bits×16 and is capable of storing transparency data designated in 64 scales for every 16 colors. In accordance with a second transfer signal which is generated from a transfer signal generator 37 to be described later, all the data stored in the RAM 26 is read out in the order of addresses and is transferred to the RAM 28.

The color number data read out from the V-RAM 23 is sent from its data output terminal to the second CLUT RAM 27 and the second TLUT RAM 28 via a selector 24. The selector 24, to which the output of the latch circuit 21 is connected, functions in accordance with the output signal of the address calculating circuit 22.

The latch controller 29 generates a latch signal to command the holding of new data in synchronism with the vertical sync signal. The vertical sync signal is used in a CRT display 33. The latch controller 29 may be a pulse generator which generates a pulse signal having a predetermined width upon reception of the vertical sync signal. The latch signal is supplied to the latch circuits 13, 15, 17, 19 and 21 and the transfer signal generators 36 and 37. The transfer signal generator 36 immediately generates the first transfer signal in response to the first latch signal supplied after a write signal is output from the output terminal C-WRITE of the interpreter 11. The transfer signal generator 37 immediately generates the second transfer signal in response to the first latch signal supplied after a write signal is output from the output terminal T-WRITE of the interpreter 11.

D/A converters 30 and 31 are respectively connected to the outputs of the RAMs 27 and 28. The D/A converter 30 converts a digital RGB signal into an analog graphics RGB signal and sends it to a mixer 32, while the D/A converter 31 converts a digital transparency signal into an analog transparency signal and sends it to the mixer 32. The mixer 32 also receives an analog dynamic RGB signal as a reproduced video signal from the disc player. The mixer 32 determines the ratio of combination of the graphics RGB signal to the dynamic RGB signal in accordance with the transparency signal.

With the above arrangement, when the interpreter 11 discriminates from the contents of symbol 1 that the graphics command is the PRESET MEMORY command of the instruction 1, the interpreter 11 outputs a write signal from the output terminal V-WRITE, color number data designated by COLOR of symbol 4 from the output terminal COLOR DATA, and a column signal and a row signal to sequentially designate all the pixels in the screen region from the respective output terminals COLUMN and ROW. The column and row signals are supplied to the address calculating circuit 22, which in turn calculates the write address as data according to the column and row signals and sequentially sends the write address data to the address terminal of the V-RAM 23. As a result, the same color number data is written in the memory locations specified by all the addresses in the V-RAM 23. Data indicating "0" is output from the output terminals PH and PV, resetting the registers 16 and 18.

When discriminating that the graphics command is the PRESET BORDER command of the instruction 2, the interpreter 11 outputs color number data specified by COLOR of symbol 4 from the output terminal BORDER COLOR. This color number data is stored in the register 20.

When discriminating that the graphics command is the WRITE FOREGROUND/BACKGROUND FONT command of the instruction 6, the interpreter 11 outputs a write signal from the output terminal V-WRITE, a column signal and a row signal to designate the pixel for one font from the respective output terminals COLUMN and ROW based on ROW and COLUMN of symbols 6 and 7, and color number data designated by COLOR 0 of symbol 4 or COLOR 1 of symbol 5 from the output terminal COLOR DATA in association with "0" or "1" of the individual pixels of the font data of symbols 8 to 19. The column and row signals are supplied to the address calculating circuit 22. This circuit 22 calculates the write address data for one font according to the column and row signals and sequentially sends the write address data to the address terminal of the V-RAM 23. As a result, the data at the memory location for one font is renewed by the new color number data in the V-RAM 23.

When discriminating that the graphics command is the preset-furnished SCROLL SCREEN command of the instruction 20, the interpreter 11 outputs an output value from the output terminal COPH in accordance with the value of COPH of symbol 5. That is, "0" is output for COPH=0, "−1" is output for COPH=1, and "+1" is output for COPH=2. For COPV of symbol 6, the interpreter 11 likewise outputs an output value from the output terminal COPV in accordance with the value of COPV of symbol 6. More specifically, "0" is output for COPV=0, "−1" is output for COPV=1, and "+1" is output for COPV=2. The interpreter 11 also outputs the value of the horizontal screen pointer PH in symbol 5 and the value of the vertical screen pointer PV in symbol 6 from the output terminals PH and PV, respectively. The interpreter 11 further outputs color number data designated by COLOR of symbol 4 from the output terminal COLOR DATA, and a column signal and a row signal to sequentially designate all the pixels in the region to be preset from the respective output terminals COLUMN and ROW. The column and row signals are supplied to the address calculating circuit 22. This circuit 22 calculates the write address data according to the column and row signals and sequentially sends the write address data to the address terminal of the V-RAM 23. As a result, the data at the memory location for the region to be preset is renewed by the new color number data in the V-RAM 23. When discriminating that the graphics command is the copy-furnished SCROLL SCREEN command of the instruction 24, the interpreter 11 functions in the same manner as in the case where the graphics command is judged to be the preset-furnished SCROLL SCREEN command of the instruction 20. It should however be noted that no color number data will be output from the output terminal COLOR DATA, ROW and COLUMN since there is no designation by COLOR of symbol 4.

The output data from the output terminal COPH activates the counter 12, incrementing or decrementing the value of the counter 12 by the value indicated by that output data. The output data from the output terminal COPV activates the counter 14, incrementing or decrementing the value of the counter 14 by the value indicated by that output data. The individual pieces of output data of the output terminals PH, PV and BORDER COLOR are held in the registers 16, 18 and 20, respectively. When receiving the latch signal synchronous with the vertical sync signal from the latch controller 29, the latch circuits 13, 15, 17, 19 and 21 respectively latch and hold the count values of the counters 12 and 14 and the values held in the registers 16, 18 and 20. The address calculating circuit 22 computes the read address when no write signal is supplied from the output terminal V-WRITE. The read address ADDRESS is computed as follows:

$$ADDRESS = HSP \times 6 + PH + (VSP \times 12 + PV) \times 300 + N$$

where HSP is the output value of the latch circuit 13, VSP is the output value of the latch circuit 15, PH is the output value of the latch circuit 17, PV is the output value of the latch circuit 19, and N is a value among 0 to 299 which increases at a given timing in synchronism with the horizontal sync signal. 4-bit color number data is read out from the memory location in the V-RAM 23 which is specified by the read address ADDRESS computed in the above manner. This 4-bit color number data is supplied via the selector 24 to the RAMs 27 and 28. Graphics RGB data with a color tone corresponding to the color number data is read out from the RAM 27 referring to the CLUT. Transparency data corresponding to the color number data is read out from the RAM 28 referring to the TLUT. The address calculating circuit 22 generates a switch signal to switch the input selection of the selector 24 when the calculated read address is other than the address of the V-RAM 23. In accordance with the switch signal, the selector 24 functions in such a way that 4-bit color number data of the border region is supplied via the selector 24 to the RAMs 27 and 28 from the latch circuit 21.

The read-out graphics RGB data and transparency data are converted into analog graphics RGB signal and analog transparency signal by the respective D/A converters 30 and 31 before being supplied to the mixer 32. The mixer 32 mixes the graphics RGB signal and the dynamic RGB signal in the ratio of combination according to the transparency signal. In other words, the graphics RGB signal is output directly from the mixer 32 when the transparency signal indicates "000000" or the opaque state, and the dynamic RGB signal is output directly from the mixer 32 when the transparency signal indicates "111111" or the highest transparency. The RGB signal output from the mixer 32 is supplied to the CRT display 33 serving as an image display apparatus, so that, for example, a dynamic image combined with a graphics image is displayed on the CRT display 33.

When discriminating that the graphics command is the LOAD CLUT COLOR 0–7 command of the instruction 30, the interpreter 11 sends a write signal to the RAM 25 from the output terminal C-WRITE and sequentially outputs graphics RGB data consisting of 3×4 bits for eight colors from the output terminal COLOR DATA in accordance with COLOR-0 to COLOR-7 of symbols 4 to 19. The RGB data is written in the memory location in the RAM 25 specified in the order of color numbers in response to the write signal, updating the CLUT of the RAM 25.

The transfer signal generator 36 generates the first transfer signal upon generation of the first latch signal after the production of that write signal. In response to the first transfer signal, the RGB data is read out from the RAM 25 in the order of addresses and is supplied to the RAM 27. The RGB data from the RAM 25 is written in the memory location in the RAM 27 specified in the order of color numbers in response to the first transfer signal, updating the CLUT of the RAM 27. Those updating operations are carried out in the same manner when the graphics command is discriminated to be the LOAD CLUT COLOR 8-16 command of the instruction 38.

When discriminating that the graphics command is the SET TRANSPARENCY command of the instruction 28, the interpreter 11 sends a write signal to the RAM 26 from the output terminal T-WRITE and outputs 6-bit transparency data from the output terminal TRANS DATA in accordance with TRANS-0 to TRANS-15 of symbols 4 to 19. The transparency data is written in the memory location in the RAM 26 specified in the order of color numbers in response to the write signal, updating the TLUT of the RAM 26. The transfer signal generator 37 generates the second transfer signal upon generation of the first latch signal after the production of that write signal. In response to the second transfer signal, the transparency data is read out from the RAM 26 in the order of addresses and is supplied to the RAM 28. The transparency data is written in the memory location in the RAM 28 specified in the order of color numbers in response to the second transfer signal, updating the TLUT of the RAM 28.

While the latch circuits 13, 15, 17, 19 and 21 and the RAMs 27 and 28 hold new values at a timing synchronous with the vertical sync signal in the above-described embodiment, they may be designed to hold new values at a timing synchronous with the horizontal sync signal.

Although the V-RAM 23 as a display memory stores color number data indicating fonts only for the screen region and the register 20 holds color number data for the border region in the above embodiment, the V-RAM 23 may be designed to store the color number data for the border region as well.

Although both the RAMs 25 and 27 have CLUTs in the above embodiment, the RAM 25 need not have a CLUT as long as it can store RGB data in the order of color numbers. Likewise, although both the RAMs 26 and 28 have TLUTs, the RAM 26 need not have a TLUT as long as it can store transparency data in the order of color numbers.

In the graphics decoder of the present invention, when the graphics command is the screen-scroll command, scroll data is acquired from pointer data included in that scroll command, and that scroll data is output to the address setting means at a timing synchronous with the horizontal sync signal or vertical sync signal to set the read address of the display memory. When the graphics command is the CLUT write command, the CLUT is updated at a timing synchronous with the first horizontal sync signal or vertical sync signal after the generation of that write command. Accordingly, when data such as the color number or the designated color for the color number or the read address of the V-RAM is varied according to the graphics command, the change occurs in synchronism with the horizontal sync signal or vertical sync signal. It is therefore possible to prevent the designated color for the foreground color or background color with the same font from changing or a relative change in the read address by the SCROLL SCREEN command, thereby preventing flickering or unnatural image distortion from occurring on the screen.

What is claimed is:

1. A graphics decoder for producing a graphics RGB signal to be supplied to an image display apparatus from a command code signal including various kinds of graphics data, comprising:

interpreting means for interpreting a graphics command in said command code signal;

a display memory having a plurality of memory locations corresponding to pixels of said image display apparatus;

writing means for, when a result of interpretation in said interpreting means is a write command, writing color number data included in said write command at a designated memory location in said display memory;

data generating means for, when the result of interpretation in said interpreting means is a screen-scroll command, generating scroll data in accordance with pointer data included in said screen-scroll command;

read address setting means for sequentially setting a read address of said display memory in accordance with said scroll data;

reading means for reading out color number data from a memory location in said display memory which corresponds to said read address; and first storage means having a color look-up table to be updated by graphics RGB data for each color number included in a color look-up table write command, for, when the result of interpretation in said interpreting means is said color look-up table write command, reading out graphics RGB data associated with the read-out color number data from said color look-up table and outputting said graphics RGB data as said graphics RGB signal, whereby outputting of new scroll data from said data generating means and updating of said color look-up table in said first storage means are performed at timings synchronous with a horizontal sync signal or a vertical sync signal of said image display apparatus.

2. A graphics decoder according to claim 1, wherein said data generating means receives a first horizontal screen pointer indicating the amount of horizontal shift for font-by-font horizontal movement, a second horizontal screen pointer indicating the amount of horizontal shift for pixel-by-pixel horizontal movement, a first vertical screen pointer indicating the amount of vertical shift for font-by-font vertical movement, and a second vertical screen pointer indicating the amount of vertical shift for pixel-by-pixel vertical movement as said pointer data, and has a first counter for accumulating said first horizontal screen pointer, a second counter for accumulating said first vertical screen pointer, a first register for holding said second horizontal screen pointer, a second register for holding said second vertical screen pointer, and first latch means for latching outputs of said first and second counters and those of said first and second registers, whereby said first latch means holds and outputs said scroll data generated from said first and second counters and said first and second registers at a timing synchronous with said horizontal sync signal or said vertical sync signal.

3. A graphics decoder according to claim 1, wherein said first storage means comprises a first RAM whose data is rewritten with graphics RGB data corresponding to a color number included in said color look-up table write command when the result of interpretation of said interpreting means is that color look-up table write command, and a second RAM having said color look-up table which is updated when all data stored in said first RAM is transferred to said second RAM at a timing synchronous with said horizontal sync signal or said vertical sync signal.

4. A graphics decoder according to claim 1, further comprising second storage means having a transparency look-up table to be updated by transparency data for each color number included in a transparency look-up table write command, for, when the result of interpretation in said interpreting means is said transparency look-up table write command, reading out transparency data associated with the read-out color number data from said transparency look-up table and outputting said transparency data, whereby updating of said transparency look-up table in said second storage means is performed at a timing synchronous with said horizontal sync signal or said vertical sync signal.

5. A graphics decoder according to claim 4, wherein said second storage means comprises a third RAM whose data is rewritten with transparency data corresponding to a color number included in said transparency look-up table write command when the result of interpretation of said interpreting means is that transparency look-up table write command, and a fourth RAM having said transparency look-up table which is updated when all data stored in said third RAM is transferred to said fourth RAM at a timing synchronous with said horizontal sync signal or said vertical sync signal.

6. A graphics decoder according to claim 1, wherein the screen of said image display apparatus comprises a screen region capable of actually displaying an image and a border region outside said screen region, said display memory is provided with said memory locations corresponding to respective pixels of said screen region, and includes a border color register for storing color number data included in a preset command to preset said border region when the result of interpretation in said interpreting means is that preset command and a second latch means for holding the color number data held in said border color register in synchronism with said horizontal sync signal or said vertical sync signal, whereby when said address setting means sets a read address of said border region, said reading means reads out the color number data in said second latch means.

* * * * *